United States Patent
Gray

(10) Patent No.: US 10,740,808 B2
(45) Date of Patent: Aug. 11, 2020

(54) BEACON NETWORK WITH ENTERPRISE SMART CONTRACTS HAVING A CENTRALIZED LEDGER

(71) Applicant: Microsoft Technology Licensing, LLC, Redmond, WA (US)

(72) Inventor: John Marley Gray, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 15/824,005

(22) Filed: Nov. 28, 2017

(65) Prior Publication Data
US 2019/0164136 A1    May 30, 2019

(51) Int. Cl.
| | |
|---|---|
| *G06Q 30/06* | (2012.01) |
| *G06Q 20/06* | (2012.01) |
| *G06F 16/27* | (2019.01) |
| *G06Q 20/40* | (2012.01) |
| *G06Q 20/02* | (2012.01) |
| *H04L 29/06* | (2006.01) |
| *G06F 21/41* | (2013.01) |

(52) U.S. Cl.
CPC ......... *G06Q 30/0611* (2013.01); *G06F 16/27* (2019.01); *G06F 21/41* (2013.01); *G06Q 20/02* (2013.01); *G06Q 20/06* (2013.01); *G06Q 20/405* (2013.01); *H04L 63/061* (2013.01); *G06Q 2220/00* (2013.01)

(58) Field of Classification Search
CPC ...... G06Q 20/06; G06Q 20/405; G06Q 20/02; G06Q 30/0611; G06Q 2220/00; G06F 16/27; G06F 21/41; H04L 63/061
See application file for complete search history.

(56) References Cited

U.S. PATENT DOCUMENTS

| | | | |
|---|---|---|---|
| 9,870,508 B1 * | 1/2018 | Hodgson | G11B 27/10 |
| 2016/0284033 A1 | 9/2016 | Winand et al. | |
| 2017/0279774 A1 * | 9/2017 | Booz | G06F 16/24568 |

(Continued)

FOREIGN PATENT DOCUMENTS

WO    2017178956 A1    10/2017

OTHER PUBLICATIONS

"International Search Report and Written Opinion Issued in PCT Application No. PCT/US18/062149", dated Feb. 20, 2019, 12 Pages.

*Primary Examiner* — Yogesh C Garg
(74) *Attorney, Agent, or Firm* — David Chin; Chin IP, PLLC

(57) ABSTRACT

The disclosed technology is generally directed to smart contracts. In one example of the technology, a first sub-contract is initialized based on communications from a first beacon node and a second beacon node. Initializing the first sub-contract includes seeding an asset on a ledger based on the first sub-contract. One or more additional sub-contracts are initialized based on communications from the beacon nodes such that the first sub-contract and the one or more additional sub-contracts together form an enterprise smart contract, and such that each sub-contract of the enterprise smart contract interrelates to at least one other sub-contract of the enterprise smart contract. Execution of logic for the enterprise smart contract is controlled. Information associated with the execution of the logic for the enterprise contract is stored on the ledger.

20 Claims, 5 Drawing Sheets

(56) References Cited

U.S. PATENT DOCUMENTS

| | | | |
|---|---|---|---|
| 2018/0144156 A1* | 5/2018 | Marin | G06F 21/6272 |
| 2018/0174122 A1* | 6/2018 | Mattingly | G06Q 30/0631 |
| 2019/0082007 A1* | 3/2019 | Klarman | H04L 67/1091 |
| 2019/0163896 A1* | 5/2019 | Balaraman | G06F 21/64 |

* cited by examiner

BEACON NETWORK WITH ENTERPRISE SMART CONTRACTS HAVING A CENTRALIZED LEDGER

BACKGROUND

Blockchain systems have been proposed for a variety of application scenarios, including applications in the financial industry, health care, IoT, and so forth. For example, the Bitcoin system was developed to allow electronic cash to be transferred directly from one party to another without going through a financial institution. A bitcoin (e.g., an electronic coin) is represented by a chain of transactions that transfers ownership from one party to another party. To transfer ownership of a bitcoin, a new transaction may be generated and added to a stack of transactions in a block. The new transaction, which includes the public key of the new owner, may be digitally signed by the owner with the owner's private key to transfer ownership to the new owner as represented by the new owner public key.

Once the block is full, the block may be "capped" with a block header that is a hash digest of all the transaction identifiers within the block. The block header may be recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain may create a mathematical proof of ownership in an entity represented by a security identity (e.g., a public key), which in the case of the bitcoin system is pseudo-anonymous.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to smart contracts. In one example of the technology, a first sub-contract between at least a first counterparty and a second counterparty is initialized based on communications from a first beacon node of a plurality of beacon nodes that is associated with the first counterparty and a second beacon node of the plurality of beacon nodes that is associated with the second counterparty. In some examples, initializing the first sub-contract includes seeding an asset on a first ledger based on the first sub-contract. In some examples, one or more additional sub-contracts are initialized based on communications from the plurality of beacon nodes such that the first sub-contract and the one or more additional sub-contracts together form an enterprise smart contract, and such that each sub-contract of the enterprise smart contract interrelates to at least one other sub-contract of the enterprise smart contract. In some examples, execution of logic for the enterprise smart contract is controlled. In some examples, information associated with the execution of the logic for the enterprise contract is stored on the first ledger.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
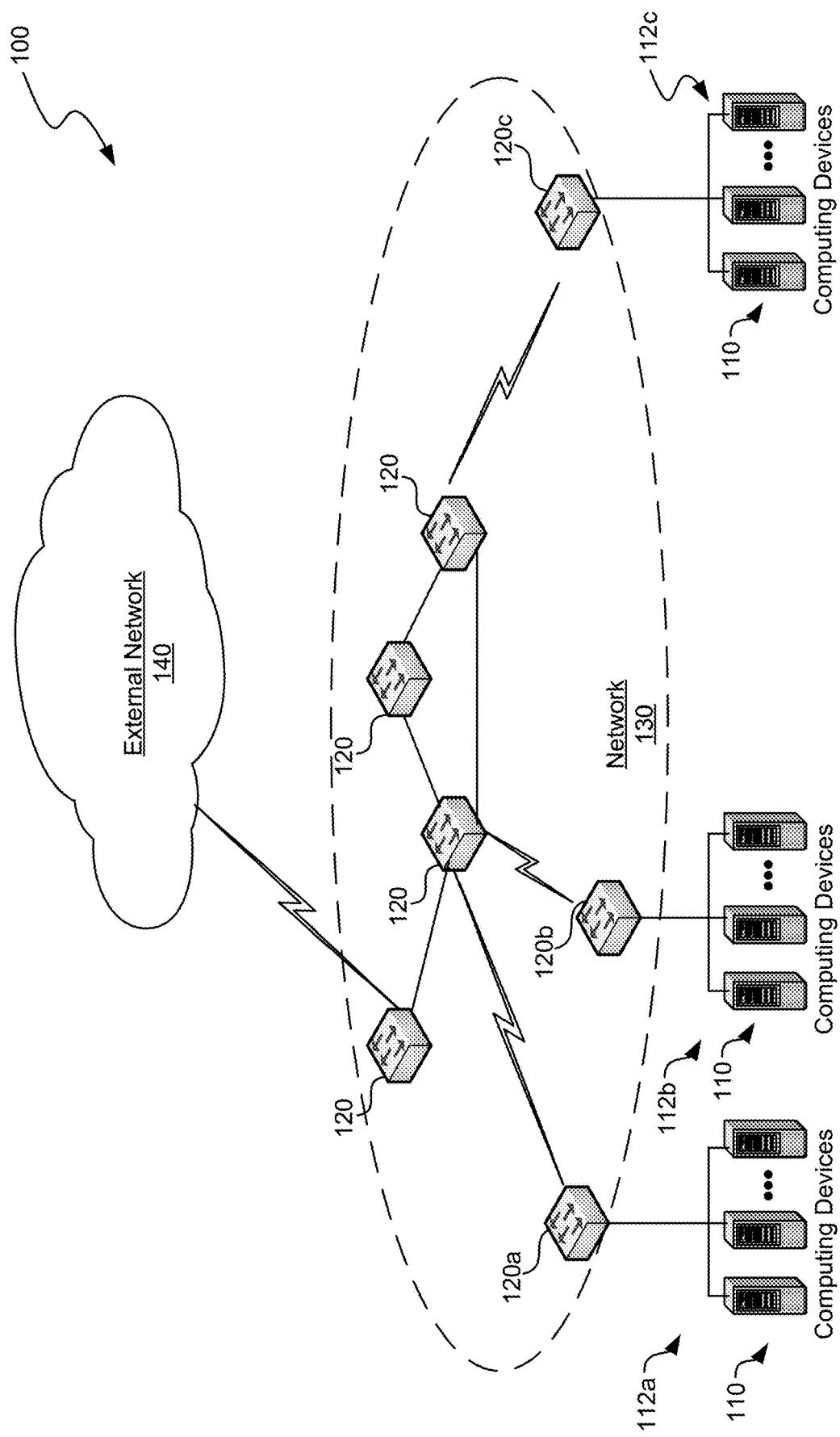
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to cryptographic functions for smart contracts. In one example of the technology, a first sub-contract between at least a first counterparty and a second counterparty is initialized based on communications from a first beacon node of a plurality of beacon nodes that is associated with the first counterparty and a second beacon node of the plurality of beacon nodes that is associated with the second counterparty. In some examples, initializing the first sub-contract includes seeding an asset on a first ledger based on the first sub-contract. In some examples, one or more additional sub-contracts are initialized based on communications from the plurality of beacon nodes such that the first sub-contract and the one or more additional sub-contracts together form an enterprise smart contract, and such that each sub-contract of the enterprise smart contract interrelates to at least one other sub-contract of the enterprise smart contract. In some examples, execution of logic for the enterprise smart contract is controlled. In some examples, information associated with the execution of the logic for the enterprise contract is stored on the first ledger.

Smart contracts typically occur in a specialized independent network that is associated with a particular type of transaction, such as a specialized banking network, a specialized insurance network, or the like. A beacon network may be used to unify such separate, specialized networks. A beacon network may include beacon nodes in which each beacon node is associated with a particular party. In some examples, a beacon node is capable of communicating with multiple different networks concurrently. These networks may include, for example, one or more dark networks. In this way, a beacon node can be connected to a specialized network as well as the dark network so that sub-contracts can be formed with parties on separate specialized networks.

Beacon nodes may be used by a party to make bids and offers. Through such bids and offers, a smart sub-contract may be initialized. The smart sub-contract may include entries on a ledger in the dark network, as well as contract logic that is executed in the dark network. One or more additional sub-contracts may result from an initial sub-contract. For example, a party may wish credit from a bank in order to fulfill an order, may wish to insure good associated with the order, and/or the like, and may make a bid accordingly. These bids may be advertised via the beacon nodes, and other parties may make offers on an advertised bid via beacon nodes, possibly resulting in additional sub-contracts. In some examples, all the sub-contracts relating to the initial sub-contract together form an enterprise smart contract.

In some examples, the logic for the enterprise smart contract is performed in the dark network, and a centralized ledger is used to store data associated with the enterprise smart contract. In some examples, the centralized ledger is used to define the enterprise smart contract, control versioning, and provide an immutable record of the enterprise smart contract for durability and distributed trust. In some examples, the beacon nodes automatically sign digital entries to the ledger. In some examples, the sub-contracts in the enterprise smart contract are interrelated, and an event associated with one sub-contract can trigger an event on another sub-contract in the same enterprise smart contract.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120C can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices no may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT support service, a device comprising part or all of an application back-end, or the like, as discussed in greater detail below.

Illustrative Computing Device

Figure 2:
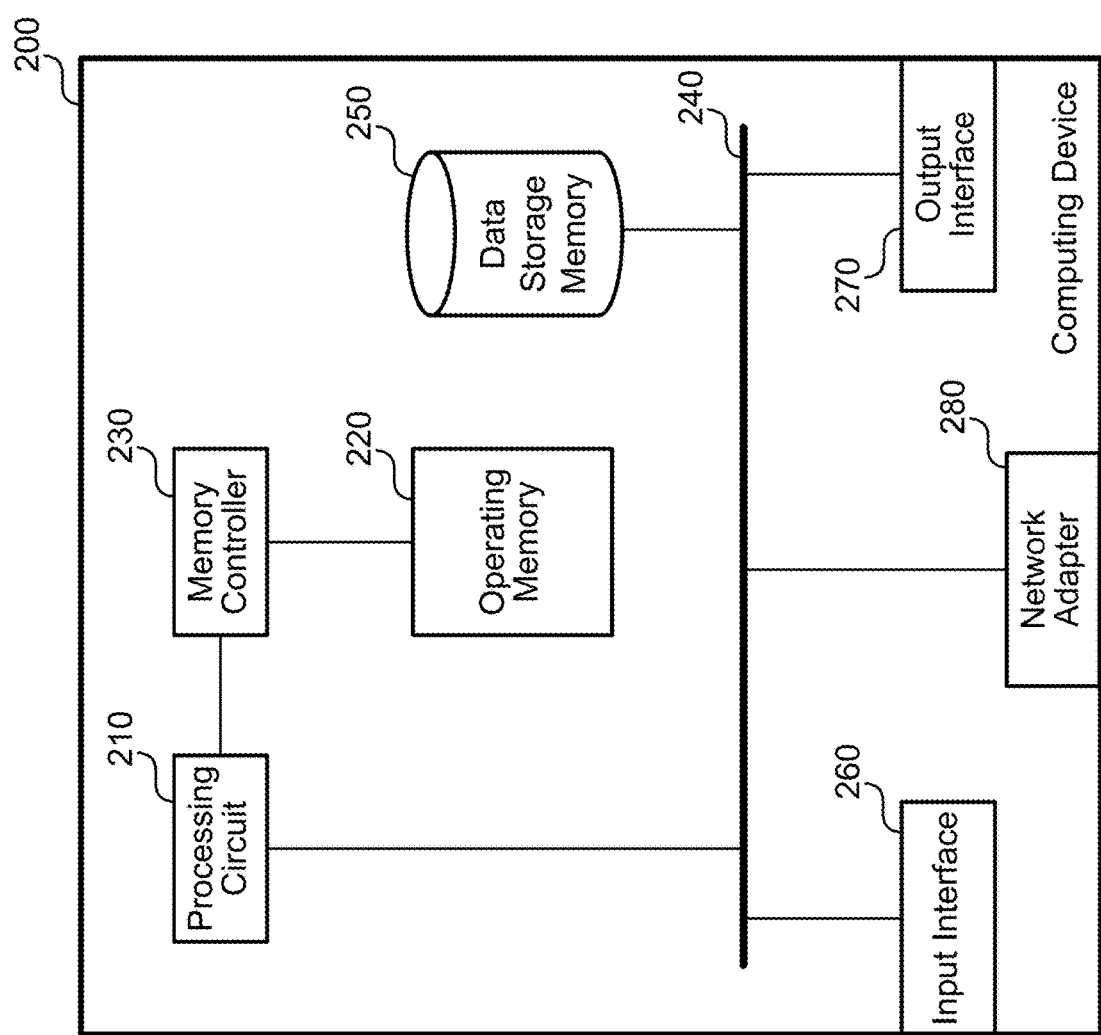
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random-access memory (DRAM), High Bandwidth Memory (HBM), Hybrid Memory Cube memory, 3D-stacked memory, static random-access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL)

adapter. Network adapter 280 may also include a wireless network adapter, for example, a Wi-Fi adapter, a Bluetooth adapter, a ZigBee adapter, a Long-Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
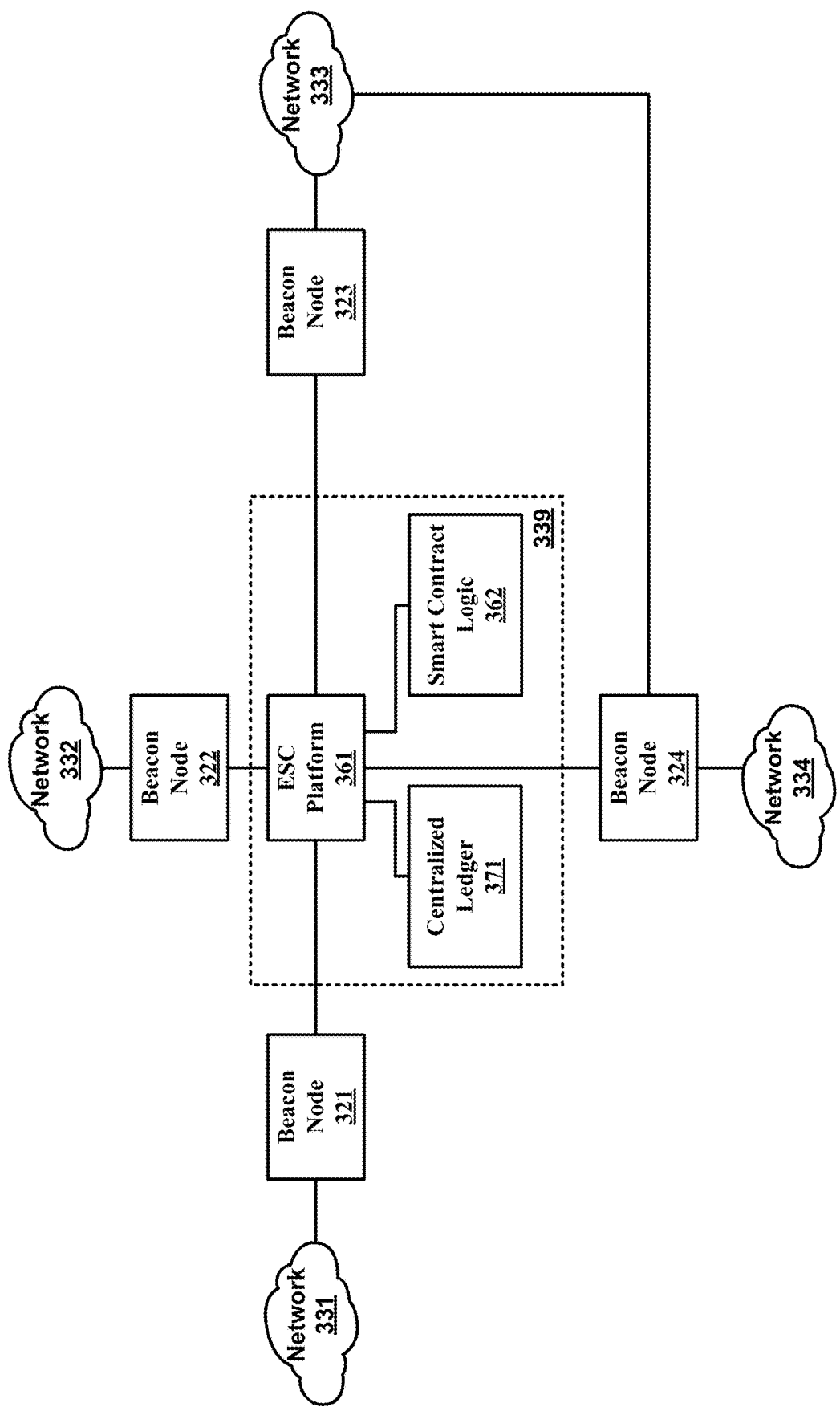
FIG. 3 is a block diagram illustrating an example of a system.

FIG. 3 is a block diagram illustrating an example of a system (300). System 300 may include beacon nodes 321-324, networks 331-334, and dark network 339. Dark network 339 may include enterprise smart contract (ESC) platform 361, smart contract logic 362, and centralized ledger 371.

In some examples, dark network 339 is a network that is available by default to each beacon node (e.g., 321-324) and which is capable of performing confidential, collaborative computing between counterparties, including, among other things, logic for ESCs. In some examples, networks 331-334 are any suitable networks to which a beacon node may connect that are separate from each other and separate from dark network 339. Some examples of networks 331-334 may be specialized networks, each associated with a particular type of transaction, such as a specialized banking network, a specialized insurance network, a specialized health care network, or the like. In some examples, beacon nodes 321-324 are network nodes that allow for the dynamic creation of ad-hoc networks, and which can be connected to one or many networks at once. In some examples, a beacon node is capable of being connected to one or many networks concurrently, including, among other networks, dark network 339 by default.

In the particular example shown in FIG. 3, beacon node 321 is connected to network 331 and dark network 339, beacon node 322 is connected to network 332 and dark network 339, beacon node 323 is connected to network 333 and dark network 339, and beacon node 324 is connected to network 333, network 334, and dark network 339. In some examples, ESC platform 339 is part of a cryptlet fabric. An ESC may include both (1) smart logic and (2) data that is stored on a centralized ledger (e.g., centralized ledger 371). In some examples, smart contract logic 362 is configured to perform the smart contract logic for ESCs. In some examples, ESC platform 361 is configured to orchestrate the formation of ESCs among parties associated with beacon nodes (e.g., beacon nodes 321-324), as well as orchestrating other aspects of the ESCs, such as the execution of logic for the ESCs performed by smart contract logic 362, and providing information about the ESCs including information about fulfillment of sub-contracts of the ESC to the beacon nodes associated with the relevant counterparties to the sub-contract.

Parties wishing to make use of services provided by a beacon network may have an associated beacon node, such as one of the beacon nodes 321-324. A beacon node may include a ledger abstraction layer that allows for the dynamic creation of ad-hoc blockchain networks using existing networks, such as networks 331-334 and dark network 339. In some examples, a beacon network is a strongly authenticated system in which all of the participants are known, trusted, and authenticated. A beacon node may be used by a party to make bids and offers. For instance, in one example, the party may, via its beacon node, create a bid for 1000 widgets with a 90-day delivery, which may be advertised for other beacon nodes to view. In some examples, bids and offers can be limited to only be visible to certain parties. Another party may, via its beacon node, make an offer that wins the bid to purchase 1,000 widgets with a 90-day delivery. ESC platform 339 may then initialize a first sub-contract based on the bid and offer for 1,000 widgets with a 90-day delivery. In some examples, as part of the initialization of the first sub-contract, ESC platform 339 may seed an asset on centralized ledger 371 based on the first sub-contract. The newly-seeded asset on the ledger may be advertised to other beacon nodes.

Additional bids and offers may be made that are based on and related to the first sub-contract. For instance, in some examples, the party associated with the beacon node that has a sub-contract to provide 1,000 widgets with a 90-day delivery may bid, via the beacon node, financing for the sub-contract. Another party, a bank, may win the bid with a credit offer via a beacon node that is associated with the bank. ESC platform 339 may initialize a sub-contract based on the bid and offer for financing, e.g., as a child sub-contract of the sub-contract.

Further, when the company that contracted to provide the 1,000 widgets is ready to ship the widgets, the company bid for insurance on the shipment. Another party may win the specialty insurance bid. ESC platform 339 may initialize a sub-contract based on the bid and offer for insurance on the shipment. The party providing the insurance may bid an IoT contract to track the temperature of the shipment. For example, the initial sub-contract may call for a delivery in which the temperature does not exceed a particular temperature limit. An IoT vendor party may win the bid to track the temperature of the shipment and feed correct readings into the contract. ESC platform 339 may initialize a sub-contract based on the bid and offer for the temperature monitoring.

In some examples, all of the sub-contracts, including the initial sub-contract and subsequent contracts that are each related to one of the other sub-contracts, together form one ESC. Smart contract logic 362 may perform logic related to execution, monitoring, and fulfillment of the sub-contracts of the ESC. Various events may trigger interrelated clauses of the ESC. For example, if the temperature of the shipment is determined to exceed the temperature limit, the logic performed by smart contract logic 362 may trigger a violation of the corresponding sub-contract, which may in turn trigger an insurance claim being filed, which in turn may trigger a remediation process to be initialized. Similarly, if the goods are shipped late, consequences may be triggered by the logic performed by smart contract logic 362. This is one example of one of many ways in which sub-contracts in an ESC can "deep-link" to each other to create a collection of sub-contracts that make up the entire ESC structure that allows for cascading events.

In some examples, an ESC is accordingly a dynamically formed, ad-hoc, multiparty composite contract similar to a dedicated network on its own. In some examples, beacon nodes advertise their offers and can respond to bids on the network that feature discovery between counterparties. Beacon filtering may be used in some examples to restrict the visibility of offers and bids. In some examples, entries to centralized ledger 371 are digitally signed by the corresponding beacon node(s). In some examples, for the entire ESC, centralized ledger 371 is used as one common ledger rather than using multiple separate ledgers, but copies of centralized ledger 371 may be made available to the counterparties. In some examples, centralized ledger 371 is an append-only database with no delete or updates functions, and in which all entries to centralized ledger 371 must be properly digitally signed before being written to the database. In some examples, centralized ledger 371 is the immutable ledger instance that is used to record all contract activities and all proofs required for the ESC. Centralized ledger 371 may also be used to define the ESC, and to control versioning for the ESC.

In some examples, logic executed by smart contract logic 362 is performed, at least in part, by cryptlets. In some examples, a cryptlet is a code component that can execute in a secure environment and be communicated with using secure channels. In some examples, a cryptlet may be a software component that inherits from base classes and implements interfaces that provide cryptographic primitives and integrations for distributed trust applications. In some examples, it is sufficient for developers to know the base classes and how to implement required and optional interfaces for cryptlets to develop on the platform. Established software development frameworks, patterns, and designs can be used for user interfaces and integration into existing systems.

Types of cryptlets may include utility cryptlets and contract cryptlets. Utility cryptlets usually perform external data integration via events internal or external, provide data access or reusable logic to blockchain smart contracts, but can also provide service level APIs for other systems to work with blockchains. Utility cryptlets whose primary purpose is to inject attested data into blockchains may be called "oracle" cryptlets. In some examples, contract cryptlets contain smart-contract-specific logic that counterparties signing the sub-contract agree to. Both types of cryptlets may provide a blockchain facing API and a Surface level API.

Regardless of how a smart contract is implemented, utility cryptlets may be used to provide information and additional computation for smart contracts in reusable libraries. These libraries may be used to create a framework for building distributed applications.

Contract cryptlets may redefine the implementation of the logic that a smart contract executes. Utility cryptlets may provide discrete functionality like providing external information, e.g., market prices, external data from other systems, or proprietary formulas. These may be called "blockchain oracles" in that they can watch and inject "real world" events and data into blockchain systems. Smart contracts may interact with these using a Publish/Subscribe pattern where the utility cryptlet publishes an event for subscribing smart contracts. The event triggers may be external (e.g., a price change) or internal (e.g., a data signal) within a smart contract or operation code. In some examples, these cryptlets can also be called directly by other cryptlets within the fabric and expose an external or surface level API that other systems can call.

Contract or control cryptlets may represent the entire logic or state in a contractual agreement between counterparties. A counterparty is a party to a smart contract, whose identity may be established via cryptographic proofs and digital signatures of participants agreeing to the terms and execution of the smart contract. In some examples, contract cryptlets used by an ESC use centralized ledger 371 to authentically store a contract's data using smart contract logic for data validity, but surrogate logic to a contract cryptlet providing "separation of concerns" within an application's design.

In essence, in some examples, contract cryptlets can run the logic of a contractual agreement between counterparties at scale, in a private secure environment, yet store data in centralized ledger 371.

In some examples, cryptlet code is packaged as a cryptlet that has its own identity that is a composite of multiple components. In some examples, the cryptlet identity is the combination of the binary hash of the compiled cryptlet, the cryptlet public key, and the binding identifier. In some examples, the cryptlet identity being composed of these three components allows for a single binary to be compiled and reused across many instances of that contract type.

For an example, for a cryptlet binary financial sub-contract that is an Interest Rate Swap, in one example, the Swap cryptlet would have a hash+public key that uniquely represents that cryptlet binary. In this example, when a new Interest Rate Swap is created, an instance of that sub-contract is created represented by a binding Id. In some examples, the binding represents the properties/rules of the Swap instance, such as the identities of the counterparties, where the cryptlet gets interest rate pricing from and how often, and/or the like.

In this way, there may be numerous instances of an Interest Rate swap with a single binary cryptlet executing each of these contracts. The unique instance is the composite cryptlet identity that represents the contract in this example.

Accordingly, in some examples, the combination of three components, (1) Binary Hash, (2) Cryptlet Public Key, and (3) Binding Id, is the instance identifier which is then represented as a hash digest for contract that is recorded on the centralized ledger 371 representing the version of logic controlling the smart contract. In some examples, an instance of a cryptlet consists of the three components (1) Binary Hash, (2) Cryptlet Public Key, and (3) Binding Id, where a general cryptlet that has not been instantiated consists of two components: (1) Binary Hash and (2) Cryptlet Public Key, and where a particular instantiation of that cryptlet would then add the binding Id of that instance of the cryptlet to generate the cryptlet identity for that instance of the cryptlet.

In some examples, a cryptlet smart contract includes a contract cryptlet, the cryptlet binding of the contract cryptlet, and a smart contract ledger instance stored on centralized ledger 371, where the smart contract ledger instance is also indicated in the cryptlet binding of the contract cryptlet. In some examples, the smart contract ledger instance has a unique public address identified such as "ox9f37b1e1d82ebcoa163cd45f9fa5b384ea7313e8." The smart contract ledger instance may include the state of the contract as well as other relevant information about the contract, as well as the digital signatures of the identities of the counterparties to the contract. The smart contract ledger instance may include various information from the lifetime of the contract, including information such as payments made, and information such as whether the contract is active, complete, awaiting counterparty signatures, or terminated.

In some examples, a smart contract ledger instance in generated in part from a schema. In some examples, a schema is a smart contract ledger template, which is used to generate a smart contract ledger instance in conjunction with basic information about the sub-contract that needs to be filled in in order to generate the smart contract ledger instance from the template, which may include, for example, the initial seed properties for the smart sub-contract. In some examples, a schema includes the data elements required for the execution and fulfillment of contract obligations between counterparties and the cryptographic proofs needed to maintain the integrity and trust in the contract for the participating counterparties and any regulatory or oversight entities. For instance, for an example smart sub-contract that is a loan agreement, initial seed properties may include, for example, who the lender is, how much money is being borrowed, and/or the like. Subsequent terms of the sub-contract may be determined through later contract negotiation, as discussed in greater detail below.

In some examples, while the smart contract ledger instance includes the state of the smart contract, digital signatures, and other relevant data concerning the smart contract, it is not the complete smart contract because it does not include the smart contract logic. The smart contract logic may be performed by a contract cryptlet for which the cryptlet binding of the contract cryptlet includes a binding that is a mapping to the unique address of the corresponding smart contract ledger instance. The smart contract logic may include contract logic following rules defined in the schema and agreed to by the counterparties and regulatory oversight parties. In some examples, cryptographic proofs required for the execution, versioning, and integrity to both the code and its results that are persisted as defined in the schema.

In some examples, the cryptlet binding also includes mappings to a set of counterparties to the contract represented as public keys that may be tied to other identity systems. These counterparties can represent two or more people, companies, IoT devices, other smart contracts, and/or the like. The cryptlet binding may also include external sources. For example, the external sources may include one or more utility cryptlets that provide external data that a contract needs for its logic, such as an interest rate or a market price to calculate a payment or fee.

A utility cryptlet may be used to present, for example, particular market data and to attest to the value of the presented market data. The cryptlet binding may include data from external sources to be received, as well as, for example, how frequently the external information is to be received. External sources may be used by sub-contracts that require external data, notification or interaction in order to fulfill the execution requirements. In some examples, these external sources are agreed to by the counterparties and the regulatory oversight entities along with the cryptographic proofs required in order to trust these external sources that are also stored in the schema.

In some examples, the beacon contract binding is created when a contract begins the negotiation process between counterparties, offers and bids. In some examples, the ESC Contract Identifier remains the same throughout the lifetime of the ESC. A major version change is a version change that requires all counterparties to the ESC to agree to the change. A minor version change is a version change that require only the counterparties to a particular sub-contract of the ESC to agree to the change.

After ESC framework 361 initializes a sub-contract, ESC framework 361 may cause a contract cryptlet to begin execution, and may provide the contract cryptlet with information, such as the initial seed properties for the sub-contract. ESC framework 361 may also fetch the contract cryptlet with a schema that is associated with the sub-contract. Based on the information received from the response to the request and the schema, ESC framework 361 may create a smart contract, and then cause a smart contract ledger instance to be deployed on centralized ledger 371.

After the smart contract ledger is deployed, ESC framework 361 may receive the unique address of centralized ledger 371, where the address acts as the unique identification of centralized ledger 371.

ESC framework 361 may also generate the cryptlet binding, which includes bindings for the contract cryptlet. In some examples, each of these bindings is a mapping between the contract cryptlet and another cryptlet, a smart contract, or an identification of a counterparty to the smart contract. The bindings may be used to route messages between the cryptlet and the other cryptlet or smart contract to which the cryptlet is mapped by the binding. The cryptlet binding may represent the properties and/or rules of the cryptlet. For instance, in an example of a cryptlet that is an interest rate swap, the cryptlet binding may include the identities (public key) of the counterparties to the interest rate swap, where the cryptlet gets interest rate pricing, and how often the cryptlet gets interest rate pricing.

The cryptlet binding may include a binding that is a mapping between the contract cryptlet and the unique address of the smart contract ledger instance, which serves as the unique identification of the smart contract ledger instance. The cryptlet binding may also include a binding for each counterparty that is represented as a public key. The cryptlet binding may include mappings to external sources of data, such as a mapping to a utility cryptlet that provides and attests to market data needed by the logic of the smart contract cryptlet.

ESC framework 361 may then communicate the cryptlet binding to the contract cryptlet.

ESC framework 361 may communicate to the smart contract ledger instance to update the smart contract ledger instance when appropriate, such as when there is a state change, or the like. ESC framework 361 may also instantiate resources for the contract cryptlet and route messages through the system. The contract cryptlet may control the negotiation process for the contract, with terms being updated as they are agreed upon during the negotiation. The communication for the negotiation may occur, for example, between the contract cryptlet and beacon nodes (e.g., 321-324) via ESC framework 361. In some examples, the smart sub-contract is finalized once all parties digitally sign the smart sub-contract. In some examples, once all parties have digitally signed the smart sub-contract, then the contract binding is completed, and the contract cryptlet begins to run the actual contract logic.

In some examples, after an ESC is complete, the contract cryptlet instance no longer exists, but the smart contract ledger instance still exists, and it is possible afterwards for an authorized party to review the ledger to obtain historical information about the contract. In some examples, the contract cryptlet does not persistently store its state or any other aspects of the contract; rather, the contract cryptlet uses centralized ledger 371 to store the state of the contract cryptlet and other smart contract data.

As a non-limiting example, an overview of a process that employs use of a Cryptlet Smart Contract may include:

1. A request for a new sub-contract being made to ESC 361, or is inferred by ESC 361 based on communications between beacon nodes. The request in some cases is made is to a contract cryptlet that is executing in waiting or newly instantiated by ESC 361 to handle the request to begin the contract creation process.

2. The contract cryptlet takes the new sub-contract request, which includes initial seed information required for starting the contract which can be as little or as much information needed for that contract, e.g., contract name, description, first counterparty (e.g., lender), etc. The contract cryptlet may validate this request and generate a contract constructor message that it sends to the ESC framework. This message may be signed. This message may also include the public address(es) in the message for the contract cryptlet and/or any counterparty(-ies) in the constructor message.

3. The ESC framework may validate this request, determine the destination beacon type, format a beacon-network-specific transaction, and route this message to the appropriate beacon node. In this example, the transaction flows from the ESC framework, perhaps running in the public or a private cloud to a beacon node that can be running anywhere.

4. The beacon node may validate this message, which in some cases may first be validated to ensure this transaction message originates from valid and secure source(s), via signatures.

5. The code creating the smart contract instance may then be executed using the defined schema in the constructor and embedded the public address(es) of the owning cryptlet contract and any counterparty(-ies) in the appropriate places within the schema, e.g., to ensure only the contract cryptlet can update this instance of the contract, and establishes any counterparty(-ies) in their roles within this contract. This smart contract is given a unique identifier, usually a public key, that serves as an address where future messages for interaction can be sent. This address may be returned from the constructor message and passed back to the ESC framework.

6. The ESC framework may receive this address and create a base cryptlet contract binding. In some examples, the binding includes references to the contract cryptlet, the smart contract instance address and any counterparty(-ies) provided in the constructor message.

7. The ESC framework may then provide this binding to the contract cryptlet for it to become active with a new composite identifier, e.g., its binary hash, public address, and the binding identifier. This contract cryptlet may now be bound to service only the binding that it is associated with, and will only be allowed to work with secrets, private keys, for those entities listed in its binding.

8. In some cases, this binding ID is then passed back to the sender of the original new sub-contract request. Additional messages sent to the ESC framework referencing this binding ID should be routed to the Contract Cryptlet bound with that ID. In some cases, these additional messages include additional contract details being or to be added, like loan term, amount borrowed, and counterparty agreement (e.g., to the terms of the contract). Each of these messages may be handled by the contract cryptlet, validated, signed, and delivered as state to the underlying smart contract address.

9. In some cases, external data may be required for a contract to function, for example, a variable interest rate that can change from month to month. In these cases, a ESC framework may add a utility cryptlet to the contract binding. In some examples, this external data provider portion of the binding includes the identification of the utility cryptlet providing this data, the requirements for receiving this external data like an event: time based, threshold or ad hoc/on demand from the contract cryptlet. In some cases, these external data update rules are recorded in the sub-contract and agreed to by all the counterparties as data regarding the source and circumstances for updates to be accepted. For example, a rule may define that interest rates are to be determined on the 5th day of every month a 4:00 PM EST using the 5 Year Treasury rate+0.10 basis points from source with a name "interest rate source" and a with a particular public key. Once agreed this external data source may be added to the cryptlet binding of the contract cryptlet, and a binding for the utility cryptlet may be created and sent to the utility cryptlet. The utility cryptlet may use its binding rules to trigger data updates to be sent to the contract cryptlet. Any data updates may be signed, e.g., for validation. External data updates provided by utility cryptlets to contract cryptlets may be persisted to the smart contract address with the utility cryptlet signatures along with calculation results from the contract cryptlet with signatures, e.g., to provide proofs and attestations of data validity. As discussed above, other sub-contracts in the same ESC may also be used as sources of data.

10. Once a Cryptlet Binding has a smart contract ledger address, the counterparty signatures and optional external data source(s) defined by it becomes fully operational and can usually execute independently for the full term of the sub-contract, e.g., interacting via messages relevant to its binding. Such messages may be associated with payments, receipts, notifications, etc.

In some examples, centralized ledger 371 is used as the smart contract ledger for each sub-contract in the ESC.

Cryptlets may perform advanced, proprietary, private execution with secrets kept from counterparties, such as private keys or different variable values for counterparties that should not be shared, e.g., terms and prices. In this case, more than one instance of a cryptlet may be used in order to keep secrets (e.g., keys, contract terms) in separate secure address spaces, to provide isolation, and for privacy encryption schemes like ring or threshold encryption schemes for storing shared secrets on the blockchain. Among other things, each counterparty may have its own private user key. In some examples, one of more of the counterparties may have, as secret, negotiating terms of their portion of the smart contract, but the total smart contract can still be determined in aggregate while keeping the negotiating terms of each counterparty secret.

In some examples, cryptlets each running the same logic in a separate enclave that are hosting secrets for a single counterparty in a multi-counterparty smart contract run in a pair for two counterparties or a ring with more than two counterparties. In some examples, the cryptlets running in a pair or a ring perform the same execution logic with different cryptographic keys for signing and/or secret parameters not shared with others.

Many different types of smart contract execution logic can be executed in various examples. Some example may include a financial derivative that is active during market hours, which obtains market data, calculates distributions, and moves balances dynamically.

In some examples, cryptlets in one of these configurations participate in simple consensus processes with a witness providing validation, such as Paxos, a simple 100% match between pairs, and/or the like. In some examples, the witness also acts as a notary.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 4:
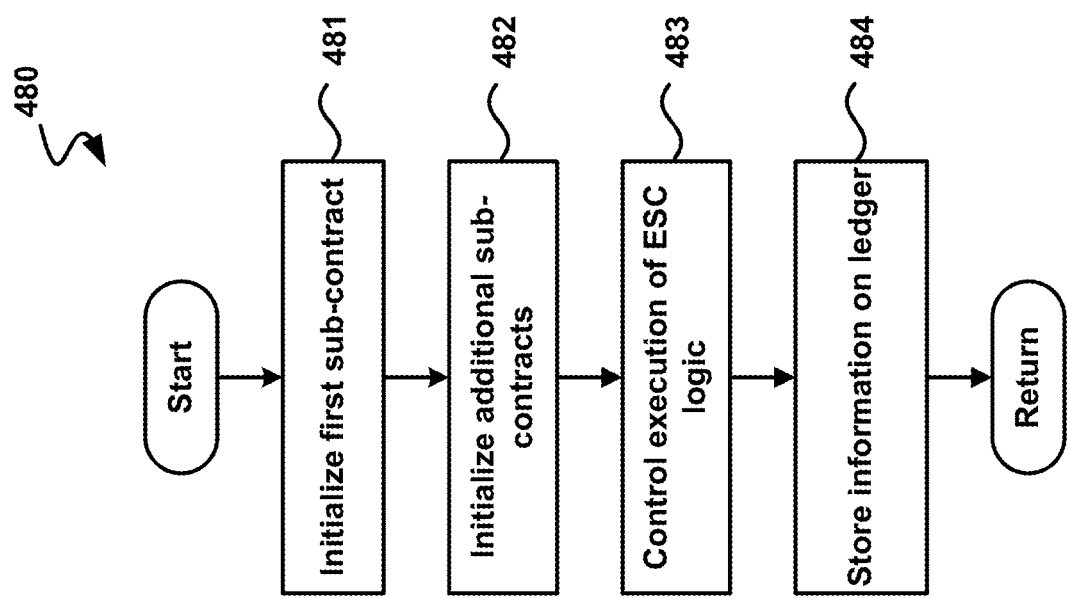
FIG. 4 is an example dataflow for a process.

FIG. 4 is a flow diagram illustrating an example process (480) that may be performed, e.g., by an ESC framework, such as ESC framework 371 of FIG. 3.

In the illustrated example, step 481 occurs first. At step 481, in some examples, a first sub-contract between at least a first counterparty and a second counterparty is initialized based on communications from a first beacon node of a plurality of beacon nodes that is associated with the first counterparty and a second beacon node of the plurality of beacon nodes that is associated with the second counterparty. In some examples, initializing the first sub-contract includes seeding an asset on a first ledger based on the first sub-contract. As shown, step 482 occurs next in some examples. At step 482, in some examples, one or more additional sub-contracts are initialized based on communications from the plurality of beacon nodes such that the first sub-contract and the one or more additional sub-contracts together form an ESC, and such that each sub-contract of the ESC interrelates to at least one other sub-contract of the ESC.

As shown, step 483 occurs next in some examples. At step 483, in some examples, execution of logic for the ESC is controlled. As shown, step 484 occurs next in some examples. At step 484, in some examples, information associated with the execution of the logic for the enterprise contract is stored on the first ledger. The process may then proceed to a return block, where other processing is resumed.

Figure 5:
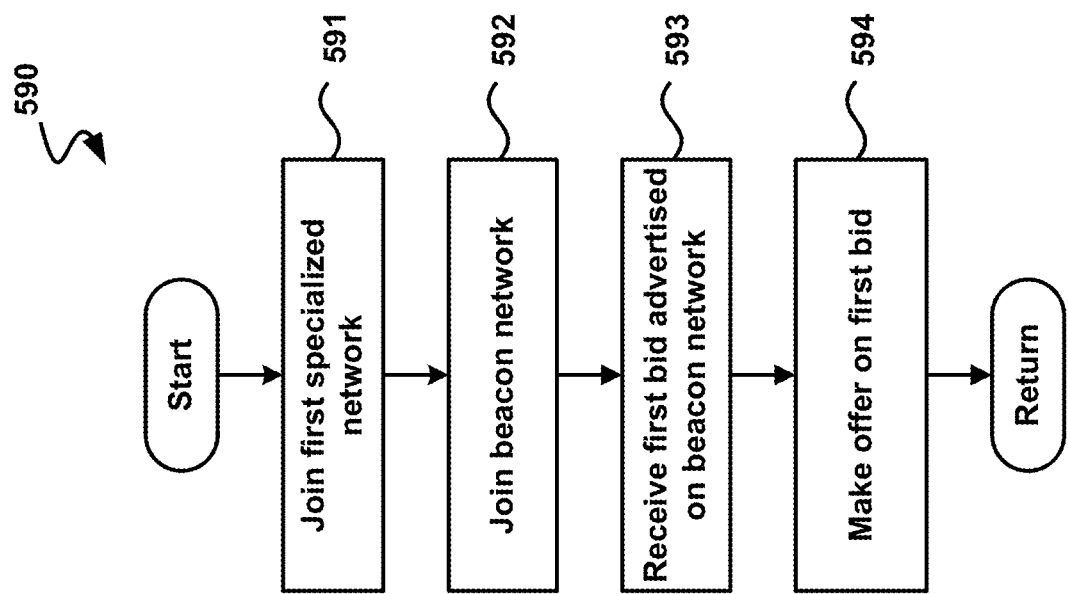
FIG. 5 is an example dataflow for another process, in accordance with aspects of the present disclosure.

FIG. 5 is a flow diagram illustrating an example process (590) that may be performed, e.g., by a beacon node, such as one of the beacon nodes 321-324 of FIG. 3.

In the illustrated example, step 591 occurs first. At step 591, in some examples, a first specialized network is joined. As shown, step 592 occurs next in some examples. At step 592, in some examples, a beacon network that includes a plurality of additional beacon nodes is joined.

As shown, step 593 occurs next in some examples. At step 593, in some examples, a first bid that is advertised on the beacon network is received. In some examples, the first bid is related to at least one previous sub-contract. In some examples, stored data associated with the at least one previous sub-contract is stored in a centralized ledger. In some examples, the bid is associated with a first beacon node of the plurality of beacon nodes. In some examples, the first beacon node is on the beacon network and is also on a second specialized network that is independent of the first specialized network. As shown, step 594 occurs next in some examples. At step 594, in some examples, an offer is made on the first bid. The process may then proceed to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. An apparatus, comprising:
a device including at least one memory adapted to store run-time data for the device, and at least one processor that is adapted to execute processor-executable code that, in response to execution, enables the device to perform actions, including:
    initializing a first sub-contract between at least a first counterparty and a second counterparty based on communications from a first beacon node of a plurality of beacon nodes that is associated with the first counterparty and a second beacon node of the plurality of beacon nodes that is associated with the second counterparty, wherein initializing the first sub-contract includes seeding an asset on a first ledger based on the first sub-contract;
    initializing one or more additional sub-contracts based on communications from the plurality of beacon nodes such that the first sub-contract and the one or more additional sub-contracts together form an enterprise smart contract, and such that each sub-contract of the enterprise smart contract interrelates to at least one other sub-contract of the enterprise smart contract;
    controlling execution of logic for the enterprise smart contract such that a triggering of at least one event that corresponds to the first sub-contract causes a programmatic triggering of another event that corresponds to at least one of the one more additional sub-contracts; and
    storing information associated with the execution of the logic for the enterprise contract on the first ledger.

2. The apparatus of claim 1, wherein, for each entry on the first ledger, at least one beacon node of the plurality of beacon nodes digitally signs the entry.

3. The apparatus of claim 1, wherein the enterprise smart contract is dynamically formed from sub-contracts from multiple parties, and the ledger is a centralized ledger made available to each of the multiple parties.

4. The apparatus of claim 1, wherein the first sub-contract is initialized in response to a first bid from the first beacon node and a winning offer on the first bid from the second beacon node.

5. The apparatus of claim 1, wherein at least one beacon node of the plurality of beacon nodes is connected to a first specialized network, at least another beacon node of the plurality of beacon nodes is connected to a second specialized network, and wherein the second specialized network is independent of the first specialized network.

6. The apparatus of claim 1, wherein each of the one or more additional sub-contracts is initialized based on a subsequent bid associated with one of the plurality of beacon nodes arising from one of the other sub-contracts in the enterprise smart contract and a winning offer on the subsequent bid associated with another of the plurality of beacon nodes.

7. The apparatus of claim 1, wherein the execution of logic for the enterprise smart contract includes monitoring and fulfilling of the sub-contracts of the enterprise smart contract.

8. A method, comprising:
via at least one processor, causing information to be stored on a first ledger based on initializing a first sub-contract between at least a first counterparty and a second counterparty responsive to communications from a first beacon node of a plurality of beacon nodes that is associated with the first counterparty and a second beacon node of the plurality of beacon nodes that is associated with the second counterparty;
causing additional information to be stored on the first ledger based on initializing one or more additional sub-contracts in response to communications from the plurality of beacon nodes such that the first sub-contract and the one or more additional sub-contracts together form an enterprise smart contract, and such that each sub-contract of the enterprise smart contract interrelates to at least one other sub-contract of the enterprise smart contract; and
controlling execution of logic for the enterprise smart contract such that a triggering of at least one event that corresponds to the first sub-contract causes a programmatic triggering of another event that corresponds to at least one of the one more additional sub-contracts.

9. The method of claim 8, further comprising:
storing information associated with the execution of the logic for the enterprise contract on the first ledger.

10. The method of claim 8, wherein, for each entry on the first ledger, at least one beacon node of the plurality of beacon nodes digitally signs the entry.

11. The method of claim 8, wherein the enterprise smart contract is dynamically formed from sub-contracts from multiple parties, and the ledger is a centralized ledger made available to each of the multiple parties.

12. The method of claim 8, wherein the first sub-contract is initialized in response to a first bid from the first beacon node and a winning offer on the first bid from the second beacon node.

13. The method of claim 8, wherein at least one beacon node of the plurality of beacon nodes is connected to a first specialized network, at least another beacon node of the plurality of beacon nodes is connected to a second specialized network, and wherein the second specialized network is independent of the first specialized network.

14. The method of claim 8, wherein each of the one or more additional sub-contracts is initialized based on a subsequent bid associated with one of the plurality of beacon nodes arising from one of the other sub-contracts in the enterprise smart contract and a winning offer on the subsequent bid associated with another of the plurality of beacon nodes.

15. The method of claim 8, wherein the execution of logic for the enterprise smart contract includes monitoring and fulfilling of the sub-contracts of the enterprise smart contract.

16. An apparatus, comprising:
a beacon node including at least one memory adapted to store run-time data for the device, and at least one processor that is adapted to execute processor-executable code that, in response to execution, enables the device to perform actions, including:
joining a first specialized network;
joining a beacon network that includes a plurality of additional beacon nodes;
receiving a first bid that is advertised on the beacon network, wherein the first bid is related to at least one previous sub-contract, wherein stored data associated with the at least one previous sub-contract is stored in a centralized ledger, wherein a triggering of at least one event that corresponds to the at least one previous sub-contract causes a programmatic triggering of another event that corresponds to another sub-contract, wherein the bid is associated with a first beacon node of the plurality of beacon nodes, and wherein the first beacon node is on the beacon network and is also on a second specialized network that is independent of the first specialized network; and
making an offer on the first bid.

17. The apparatus of claim 16, the actions further including:
digitally signing an entry on the centralized ledger that is associated with the offer on the first bid.

18. The apparatus of claim 16, the actions further including:
agreeing to further terms associated with the first bid such that a child sub-contract is formed.

19. The apparatus of claim 18, where the previous sub-contract and the child sub-contract form at least a portion of an enterprise smart contract.

20. The apparatus of claim 18, the actions further including:
receiving information associated with fulfillment of the child sub-contract.

* * * * *